United States Patent
Estey et al.

[11] Patent Number: 5,853,881
[45] Date of Patent: Dec. 29, 1998

[54] ELASTIC LAMINATES WITH IMPROVED HYSTERESIS

[75] Inventors: Paul Windsor Estey, Cumming; William Bela Haffner, Kennesaw; Jon Edward Tinsley; Susan Elaine Shawver, both of Roswell; Stephen Clark Smith, Atlanta, all of Ga.

[73] Assignee: Kimberly-Clark Worldwide, Inc., Neenah, Wis.

[21] Appl. No.: 728,712

[22] Filed: Oct. 11, 1996

[51] Int. Cl.⁶ ........................................ D02G 3/00
[52] U.S. Cl. ..................... 428/373; 428/903; 442/328; 442/329; 442/382
[58] Field of Search ................... 442/328, 329, 442/346, 382, 400, 361–366; 428/373, 903

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 4,041,203 | 8/1977 | Brock et al. | 428/157 |
| 4,100,324 | 7/1978 | Anderson et al. | 428/288 |
| 4,340,563 | 7/1982 | Appel et al. | 264/518 |
| 4,443,513 | 4/1984 | Meitner et al. | 422/195 |
| 4,446,189 | 5/1984 | Romanek | 428/152 |
| 4,542,199 | 9/1985 | Kaminsky et al. | 526/160 |
| 4,652,487 | 3/1987 | Morman | 428/138 |
| 4,655,760 | 4/1987 | Morman et al. | 604/385 A |
| 4,657,802 | 4/1987 | Morman | 428/152 |
| 4,663,220 | 5/1987 | Wisneski et al. | 428/221 |
| 4,707,398 | 11/1987 | Boggs | 428/224 |
| 4,720,415 | 1/1988 | Vander Wielen et al. | 428/152 |
| 4,724,184 | 2/1988 | Killian et al. | 428/227 |
| 4,741,949 | 5/1988 | Morman et al. | 428/224 |
| 4,781,966 | 11/1988 | Taylor | 428/152 |
| 4,787,699 | 11/1988 | Moulin | 350/96.21 |
| 4,789,699 | 12/1988 | Kieffer et al. | 524/271 |
| 4,795,668 | 1/1989 | Krueger et al. | 428/174 |
| 4,803,117 | 2/1989 | Daponte | 428/228 |
| 4,818,464 | 4/1989 | Lau | 264/510 |
| 4,820,572 | 4/1989 | Killian et al. | 428/227 |
| 4,923,742 | 5/1990 | Killian et al. | 428/283 |
| 4,965,122 | 10/1990 | Morman | 428/225 |
| 4,981,747 | 1/1991 | Morman | 428/198 |
| 5,057,368 | 10/1991 | Largman et al. | 428/397 |
| 5,064,802 | 11/1991 | Stevens et al. | 502/155 |
| 5,069,970 | 12/1991 | Largman et al. | 428/373 |
| 5,108,820 | 4/1992 | Kaneko et al. | 428/198 |
| 5,108,827 | 4/1992 | Gessner | 428/219 |
| 5,114,781 | 5/1992 | Morman | 428/198 |
| 5,143,679 | 9/1992 | Weber et al. | 264/288.8 |
| 5,151,092 | 9/1992 | Buell et al. | 604/385.2 |
| 5,167,897 | 12/1992 | Weber et al. | 264/288.8 |
| 5,169,706 | 12/1992 | Collier, IV et al. | 428/152 |
| 5,178,931 | 1/1993 | Perkins et al. | 428/198 |
| 5,188,885 | 2/1993 | Timmons et al. | 428/198 |
| 5,189,192 | 2/1993 | LaPointe et al. | 556/11 |

(List continued on next page.)

FOREIGN PATENT DOCUMENTS

| | | | |
|---|---|---|---|
| 0 707 106 | 4/1996 | European Pat. Off. | D04H 13/00 |
| 0 712 892 | 5/1996 | European Pat. Off. | C08L 23/16 |
| 25 13 251 | 9/1976 | Germany | D01F 8/08 |
| 90/03464 | 4/1990 | WIPO | D04H 1/56 |
| 97/20091 | 6/1997 | WIPO | D04H 13/00 |

*Primary Examiner*—Jeffrey Stucker
*Attorney, Agent, or Firm*—James B. Robinson

[57] ABSTRACT

A composite elastic material is provided having improved hysteresis comprising a layer of an elastic material bonded to a layer of nonelastic material at least one side. The elastic material layer is made from a blend of a narrow polydispersity number polymer and a conventional elastomer, and the blend is essentially free of low molecular weight polyethylene processing aids. The composite elastic material laminate should have a hysteresis at least 15 percent better than a similar laminate made without the narrow polydispersity number elastomer but with the processing aid.

20 Claims, 1 Drawing Sheet

U.S. PATENT DOCUMENTS

| | | | |
|---|---|---|---|
| 5,196,000 | 3/1993 | Clear et al. | 604/385.2 |
| 5,200,443 | 4/1993 | Hudson | 524/99 |
| 5,204,429 | 4/1993 | Kaminsky et al. | 526/308 |
| 5,226,992 | 7/1993 | Morman | 156/62.4 |
| 5,244,482 | 9/1993 | Hassenboehler et al. | 55/528 |
| 5,272,236 | 12/1993 | Lai et al. | 526/348.5 |
| 5,277,976 | 1/1994 | Hogle et al. | 428/397 |
| 5,278,272 | 1/1994 | Lai et al. | 526/348.5 |
| 5,294,482 | 3/1994 | Gessner | 428/287 |
| 5,304,599 | 4/1994 | Himes | 525/98 |
| 5,332,613 | 7/1994 | Taylor et al. | 428/152 |
| 5,336,545 | 8/1994 | Morman | 428/152 |
| 5,336,552 | 8/1994 | Strack et al. | 428/224 |
| 5,349,100 | 9/1994 | Mintz | 585/350 |
| 5,352,749 | 10/1994 | DeChellis et al. | 526/68 |
| 5,366,793 | 11/1994 | Fitts, Jr. et al. | 428/198 |
| 5,374,696 | 12/1994 | Rosen et al. | 526/126 |
| 5,382,400 | 1/1995 | Pike et al. | 264/168 |
| 5,385,775 | 1/1995 | Wright | 428/284 |
| 5,466,410 | 11/1995 | Hills | 264/172.11 |
| 5,514,470 | 5/1996 | Haffner et al. | 428/246 |
| 5,624,729 | 4/1997 | Cohen et al. | 428/90 |

ELASTIC LAMINATES WITH IMPROVED HYSTERESIS

BACKGROUND OF THE INVENTION

This invention relates generally to nonwoven fabric or web laminates which contain at least one elastic layer and which are formed from fibers, films, fiber arrays and the like. The materials are made from a thermoplastic resin.

Thermoplastic resins have been extruded to form fibers, fabrics, films and he like for a number of years. The most common thermoplastics for this application are polyolefins, particularly polypropylene. Other materials such as polyesters, polyetheresters, polyamides and polyurethanes are also used to form such layers.

Nonwoven fabrics, for example, are useful for a wide variety of applications such as diapers, feminine hygiene products, towels, recreational or protective fabrics and as geotextiles and filter media. The nonwoven webs used in these applications may be simply spunbond fabrics but are often in the form of nonwoven fabric laminates like spunbond/spunbond (SS) laminates, spunbond/meltblown/spunbond (SMS) laminates and spunbond/film/spunbond laminates (SFS).

Many applications of nonwoven webs require some degree of elasticity. Applications in such items as diapers, for example, require a material which will stretch and retract with the normal movements of an infant. A diaper lacking such elastic properties would restrict movement or would allow leakage because of sagging or stretching.

Prior efforts to provide stretchable and elastic laminates have focused on styrenic copolymers which have sufficient elasticity to function well in this application. U.S. Pat. No. 4,663,220 to Wisneski et al., commonly assigned, is a good example of such an invention. These polymers have proven somewhat expensive and not entirely satisfactory in today's demanding consumer products market. There remains a need for an economical alternative to such compounds. There also remains a need for elastic materials which have better hysteresis than those currently in use.

SUMMARY OF THE INVENTION

The objects of this invention are achieved by a composite elastic material having improved hysteresis comprising a layer of an elastic material bonded to a layer of nonelastic material on at least one side. The elastic material layer is made from a blend of a narrow polydispersity number polymer and a conventional elastomer, and the blend is essentially free of low molecular weight polyethylene processing aids but may contain a tackifier. The composite elastic material laminate should have a hysteresis at least 15 percent better than a similar laminate made without the narrow polydispersity number elastomer but with the processing aid.

BRIEF DESCRIPTION OF THE DRAWINGS

The Figure is a schematic illustration of a process for forming a composite elastic necked-bonded material.

DEFINITIONS

Figure 1:
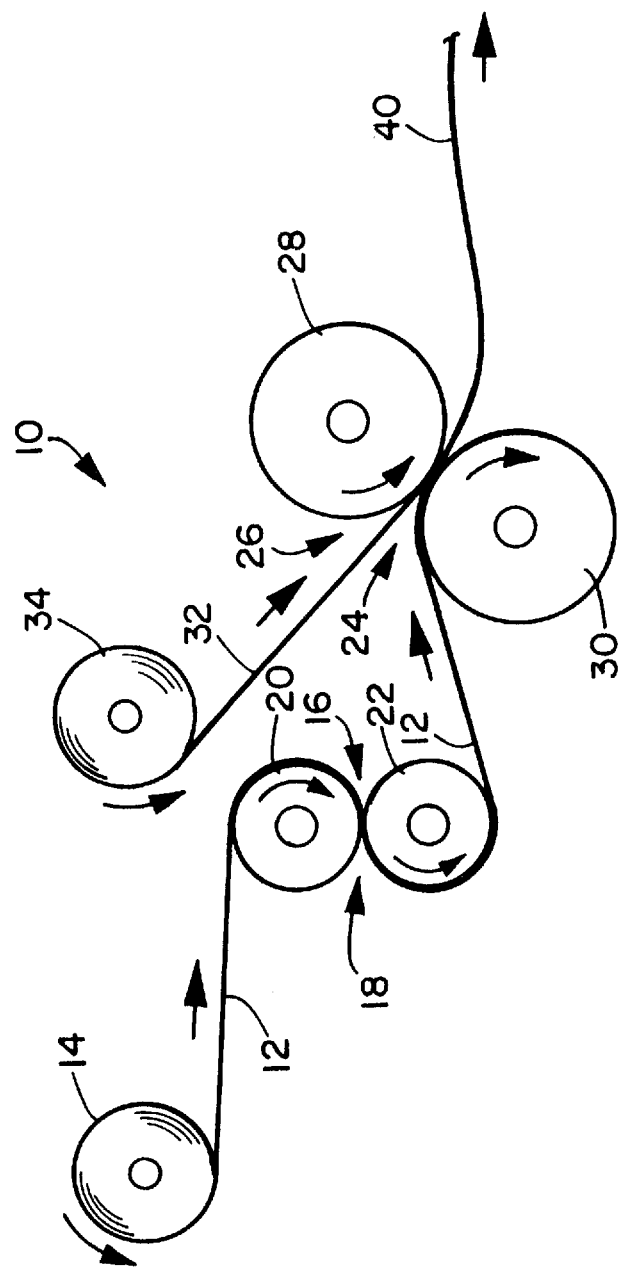

As used herein the term "nonwoven fabric or web" means a web having a structure of individual fibers or threads which are interlaid, but not in an identifiable manner as in a knitted or woven fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density of the polymer in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are usually tacky when deposited onto a collecting surface.

As used herein, "filament arrays" means substantially parallel rows of filaments which may be such as those disclosed in U.S. Pat. Nos. 5,385,775 and 5,366,793.

As used herein, the term "coform" means a process in which at least one meltblown diehead is arranged near a chute through which other materials are added to the web while it is forming. Such other materials may be pulp, superabsorbent particles, cellulose or staple fibers, for example. Coform processes are shown in commonly assigned U.S. Pat. Nos. 4,818,464 to Lau and 4,100,324 to Anderson et al. Webs produced by the coform process are generally refered to as coform materials.

As used herein "multilayer laminate" means a laminate wherein some of the layers are spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 0.1 to 12 osy (6 to 400 gsm), or more particularly from about 0.5 to about 3 osy. Multilayer laminates may also have various numbers of meltblown layers or multiple spunbond layers in many different configurations and may include other materials like films (F) or coform materials, e.g. SMMS, SM, SFS, etc.

As used herein the term "composite elastic material" refers to an elastic material which may be a multicomponent material or a multilayer material in which one layer is elastic. These materials may be, for example, "neck bonded" laminates, "stretch bonded" laminates, "neck-stretch bonded" laminates and "zero strain" laminates. Composite elastic materials may also be formed by a process in which the layers are joined in an unstretched condition and necked according to the teachings of U.S. patent application Ser. No. 08/730,511 filed in the U.S. Patent & Trademark Office on the same day as this invention, assigned to the same assignee, and entitled "LAMINATED FABRIC HAVING IMPROVED CROSS-DIRECTIONAL EXTENSIBILITY AND METHOD OF PRODUCING SAME", hereby incorporated by reference.

"Neck bonding" refers to the process wherein an elastic member is bonded to a non-elastic member while only the non-elastic member is extended or necked so as to reduce its dimension in the direction orthoganal to the extension. "Neck bonded laminate" refers to a composite elastic material made according to the neck bonding process, i.e.: the layers are joined together when only the non-elastic layer is in an extended condition. Such laminates usually have cross directional stretch properties. Examples of neck-bonded laminates are such as those described in U.S. Pat. Nos. 5,226,992, 4,981,747, 4,965,122 and 5,336,545 to Morman and U.S. Pat. No. 5,514,470 to Haffner et al.

Conventionally, "stretch bonding" refers to a process wherein an elastic member is bonded to another member while only the elastic member is extended at least about 25 percent of its relaxed length. "Stretch bonded laminate" refers to a composite elastic material made according to the stretch bonding process, i.e.: the layers are joined together when only the elastic layer is in an extended condition so that upon relaxing the layers, the nonelastic layer is gathered. Such laminates usually have machine directional stretch properties and may be subsequently stretched to the extent that the nonelastic material gathered between the bond locations allows the elastic material to elongate. One type of stretch bonded laminate is disclosed, for example, by U.S. Pat. No. 4,720,415 to Vander Wielen et al., in which multiple layers of the same polymer produced from multiple banks of extruders are used. Other composite elastic materials are disclosed in U.S. Pat. No. 4,789,699 to Kieffer et al., U.S. Pat. No. 4,781,966 to Taylor and U.S. Pat. Nos. 4,657,802 and 4,652,487 to Morman and 4,655,760 to Morman et al.

"Neck-stretch bonding" generally refers to a process wherein an elastic member is bonded to another member while the elastic member is extended at least about 25 percent of its relaxed length and the other layer is a necked, non-elastic layer. "Neck-stretch bonded laminate" refers to a composite elastic material made according to the the neck-stretch bonding process, i.e.: the layers are joined together when both layers are in an extended condition and then allowed to relax. Such laminates usually have omnidirectional stretch properties.

"Zero strain" stretch bonding generally refers to a process wherein at least two layers are bonded to one another while in an untensioned (hence zero strain) condition and wherein one of the layers is stretchable and elastomeric and the second is stretchable but not necessarily elastomeric. The laminate is then stretched incrementally through the use of one or more pairs of meshing corrugated rolls which reduce the strain rate experienced by the web. "Zero strain stretch laminate" refers to a composite elastic material made according to the the zero strain stretch bonding process, i.e.: the elastic and nonelastic layers are joined together when both layers are in an unextended condition. The second layer, upon stretching of the laminate, will be at least to a degree permanently elongated so that the laminate will not return to its original undistorted condition upon release of the stretching force. This results in z-direction bulking of the laminate and subsequent elastic extensibility in the direction of initial stretching at least up to the point of initial stretching. Examples of such laminates and their production processes may be found in U.S. Pat. Nos. 5,143,679, 5,151,092, 5,167,897, and 5,196,000.

As used herein, the terms "necking" or "neck stretching" interchangeably refer to a method of elongating a nonwoven fabric, generally in the machine direction, to reduce its width in a controlled manner to a desired amount. The controlled stretching may take place under cool, room temperature or greater temperatures and is limited to an increase in overall dimension in the direction being stretched up to the elongation required to break the fabric, which in most cases is about 1.2 to 1.4 times. When relaxed, the web retracts toward its original dimensions. Such a process is disclosed, for example, in U.S. Pat. No. 4,443,513 to Meitner and Notheis, U.S. Pat. Nos. 4,965,122, 4,981,747 and 5,114,781 to Morman and U.S. Pat. No. 5,244,482 to Hassenboehler Jr. et al.

As used herein the term "neck softening" means neck stretching carried out without the addition of heat, i.e. at ambient temperature, to the material as it is stretched in the machine direction. In neck stretching or softening, a fabric is referred to, for example, as being stretched by 20%. This means it is stretched in the machine direction until its length is 120% of its original unstretched length.

As used herein, the term "neckable material" means any material which can be necked.

As used herein, the term "necked material" refers to any material which has been constricted in at least one dimension by processes such as, for example, drawing or gathering.

As used herein, the terms "elastic" and "elastomeric" when referring to a fiber, film or fabric mean a material which upon application of a biasing force, is stretchable to a stretched, biased length which is at least about 150 percent, or one and a half times, its relaxed, unstretched length, and which will recover at least 50 percent of its elongation upon release of the stretching, biasing force.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

As used herein the term "un-necking" means a process applied to a reversibly necked material to extend it to at least its original, pre-necked dimensions by the application of a stretching force in a direction generally perpendicular to the direction of the original stretching force which causes it to recover to within at least about 50 percent of its reversibly necked dimensions upon release of the stretching force.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein the term "monocomponent" fiber refers to a fiber formed from one or more extruders using only one polymer. This is not meant to exclude fibers formed from one polymer to which small amounts of additives have been added for color, anti-static properties, lubrication, hydrophilicity, etc. These additives, e.g. titanium dioxide for color, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a pie arrangement or an "islands-in-the-sea" arrangement. Conjugate fibers are taught in U.S. Pat. No. 5,108,820 to Kaneko et al., U.S. Pat. No. 4,795,668 to Krueger et al. and U.S. Pat. No. 5,336,552 to Strack et al. Conjugate fibers are also taught in U.S. Pat. No. 5,382,400 to Pike et al. and may be used to produce crimp in the fibers by using the differential rates of expansion and contraction of the two (or more) polymers. Crimped fibers may also be produced by mechanical means and by the process of German Patent DT 25 13 251 A1. For two component fibers, the polymers may be present in ratios of 75/25, 50/50, 25/75 or any other desired ratios. The fibers may also have shapes such as those described in U.S. Pat. No. 5,277,976 to Hogle et al., U.S. Pat. Nos. 5,466,410 to Hills and 5,069,970 and 5,057,368 to Largman et al., which describe fibers with unconventional shapes.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. Nos. 5,108,827 and 5,294,482 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized.

By the term "similar web or laminate" what is meant is a web or laminate which uses essentially the same process conditions as the inventive material but in which the polymers have been changed slightly. According to *Webster's New Collegiate Dictionary* (1980), "similar" means 1) having characteristics in common; strictly comparable, 2) alike in substance or essentials; corresponding. Using this commonly accepted meaning of the word similar, this term means that all other conditions are essentially the same except for the conditions mentioned. It should be noted that not all conditions will be exactly identical between the different polymers since the changes in the composition itself cause process changes, in for example, the optimum temperatures needed.

As used herein, the term "garment" means any type of non-medically oriented apparel which may be worn. This includes industrial workwear like coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used herein, the term "personal care product" means diapers, training pants, absorbent underpants, adult incontinence products, and feminine hygiene products.

TEST METHODS

Melt Flow Rate: The melt flow rate (MFR) is a measure of the viscosity of a polymer. The MFR is expressed as the weight of material which flows from a capillary of known dimensions under a specified load or shear rate for a measured period of time and is measured in grams/10 minutes at a set temperature and load according to, for example, ASTM test 1238-90b.

Cyclic testing: Cyclic testing is performed using a Sintech 2 computerized material testing system available from Sintech Incorporated of Stoughton, Mass.

In the elongation or stretch to stop test, a 3 inch by 6 inch (76 mm by 152 mm) sample, with the larger dimension being the machine direction, is placed in the jaws of the Sintech 2 machine using a gap of 50 mm between the jaws. The sample is then pulled to a stop load of 2000 gms with a crosshead speed of about 500 mm per minute. The elongation in percent relative to the unstretched length at this point is the stretch to stop value.

The elongation at stop test also yields the value for elongation at intercept. The elongation at intercept is the load in grams where the elasticity of the material ends and the tensile strength of the sample takes over. The value of 75 percent of the elongation at intercept is used to determine the maximum percent the sample with then be stretched in the cycling test.

In the cyclic testing, a material is taken to a fixed extension corresponding to 75 percent of the elongation at intercept for 5 times, and allowed to return to its original dimensions if it will do so. The measurements taken are the load at elongation, hysteresis loss and load at return. This data may be used to develop a graphical representation of the results, with load on the y axis and elongation on the x axis. The graph yields a curve with an area thereunder called the Total Energy Absorbed or "TEA". The ratio of the TEA curves for a sample for various cycles is a value independent of material, basis weight and sample width that can be compared to other samples.

DETAILED DESCRIPTION

Elastic laminates are very useful for a number of applications like in garments, infection control products and personal care products. These materials allow such items to conform more comfortably and last longer.

One way of measuring how well elastic materials perform is by measuring their hysteresis. Hysteresis is a measure of whether or how well an elastic material retains its elastic properties over a number of stretches, and the loss of hysteresis over a number of stretch cycles should desirably be minimal. Cyclic testing is used to determine the hysteresis of a material and is explained above.

A material with no hysteresis loss would show the same force measured at 30 percent elongation during the retraction in the second cycle as the force of extension at 30 percent elongation during the first cycle. Dividing the first cycle force of extension by the second cycle force of retraction (both at 30 percent elongation) shows that such a material would have a hysteresis of 1.0. A material with some hysteresis loss would have a number above 1.0, with a smaller ratio being better.

The composite elastic material of this invention has a hysteresis ratio at 30 percent elongation which is at least a 15 percent improvement over previously known elastic laminates by virtue of the choice of materials in the elastic layer. The elastic material layer is preferably made of a blend of a conventional elastomer, and a narrow polydispersity number polyolefin elastomer, e.g., having a polydispersity of 4 or less. Polydispersity number, sometimes called polydispersity index, is defined as weight average molecular weight divided by number average molecular weight.

Referring to the Figure there is schematically illustrated at 10 a process for forming a composite elastic neck bonded material.

According to one embodiment of the present invention, a neckable, nonelastic material 12 is unwound from a supply roll 14 and travels in the direction indicated by the arrow associated therewith as the supply roll 14 rotates in the direction of the arrows associated therewith. The neckable material 12 passes through a nip 16 of the drive roller arrangement 18 formed by the drive rollers 20 and 22.

The nonelastic material 12 may be formed and passed directly through the nip 16 without first being stored on a supply roll.

An elastic material 32 is unwound from a supply roll 34 and travels in the direction indicated by the arrow associated therewith as the supply roll 34 rotates in the direction of the arrows associated therewith. The elastic material 32 passes through the nip 24 of the bonder roller arrangement 26 formed by the bonder rollers 28 and 30. The elastic material 32 may be formed and passed directly through the nip 24 without first being stored on a supply roll.

The nonelastic material 12 passes through the nip 16 of the S-roll arrangement 18 in a reverse-S path as indicated by the rotation direction arrows associated with the stack rollers 20 and 22. From the S-roll arrangement 18, the nonelastic material 12 passes through the pressure nip 24 formed by a bonder roller arrangement 26. Because the peripheral linear speed of the rollers of the S-roll arrangement 18 is controlled to be less than the peripheral linear speed of the rollers of the bonder roller arrangement 26, the nonelastic material 12 is tensioned between the S-roll arrangement 18 and the pressure nip of the bonder roll arrangement 26. By adjusting the difference in the speeds of the rollers, the nonelastic material 12 is tensioned so that it necks a desired amount and is maintained in such tensioned, necked condition while the elastic material 32 is joined to the necked nonelastic material 12 during their passage through the bonder roller arrangement 26 to form a composite elastic neck-bonded laminate 40.

Other methods of tensioning the neckable nonelastic material 12 may be used such as, for example, tenter frames or other cross-machine direction stretcher arrangements that expand the nonelastic material 12 in other directions such as, for example, the cross-machine direction so that, after bonding to the elastic material 32, the resulting composite elastic neck bonded material 40 will be elastic in a direction generally parallel to the direction of necking, i.e., in the machine direction.

Nonelastic materials 12 used in this invention may be microfiber webs, such as those made by the spunbond and meltblown processes and the microfibers may be crimped or uncrimped. The nonelastic material 12 may also be filament arrays, foams, bonded carded webs and coform webs.

The nonelastic material 12 may be made of fiber forming polymers such as, for example, polyolefins. Exemplary polyolefins include one or more of polypropylene, polyethylene, ethylene copolymers, propylene copolymers, and butene copolymers. Useful polypropylenes include, for example, polypropylene available from the Montell Corporation under the trade designation PC-973, polypropylene available from the Exxon Chemical Company under the trade designation Exxon 3445, and polypropylene available from the Shell Chemical Company under the trade designation DX 5A09.

The nonelastic material 12 may be a multilayer material having, for example, at least one layer of spunbonded web joined to at least one layer of meltblown web, bonded carded web or other suitable material. For example, nonelastic material 12 may be a multilayer material having a first layer of spunbonded polypropylene having a basis weight from about 0.2 to about 8 osy, and a second layer of spunbonded polypropylene having a basis weight of about 0.2 to about 8 osy. Alternatively, the nonelastic material 12 may be single layer of material such as, for example, a spunbonded web having a basis weight of from about 0.2 to about 10 osy or a meltblown web having a basis weight of from about 0.2 to about 8 osy.

The nonelastic material 12 may also be a composite material made of a mixture of two or more different fibers or a mixture of fibers and particulates like coform webs. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbant materials, occurs prior to collection of the meltblown fibers upon a collecting device to form a coherent web of randomly dispersed meltblown fibers and other materials such as disclosed in U.S. Pat. No. 4,100,324.

If the nonelastic material 12 is a nonwoven web of fibers, the fibers should be joined by interfiber bonding to form a coherent web structure which is able to withstand necking. Interfiber bonding may be produced by entanglement between individual meltblown fibers. The fiber entangling is inherent in the meltblown process but may be generated or increased by processes such as, for example, hydraulic entangling or needlepunching. Alternatively and/or additionally a bonding agent may be used to increase the desired bonding.

Elastic materials used in this invention may be microfiber webs, such as nonwoven webs made by the spunbond and meltblown processes and the microfibers may be crimped or uncrimped. The elastic materials may also be filament arrays, films and foams.

The nonwoven processes generally use an extruder to supply melted thermoplastic polymer to a spinneret where the polymer is fiberized to yield fibers which may be cut to staple length or longer. The fibers are then drawn, usually pneumatically, and deposited on a moving foraminous mat or belt to form the nonwoven fabric. The fibers produced in the spunbond and meltblown processes are microfibers as defined above.

The elastic material layer is preferably made of a blend of a conventional elastomer and a narrow polydispersity polyolefin elastomer, e.g., having a polydispersity of 4 or less. The elastic material layer is preferably made of a blend of from about 62 to about 80 weight percent of a conventional elastomer and from about 10 to about 30 weight percent of a narrow polydispersity polyolefin elastomer.

An elastic layer made wholly from narrow polydispersity number polymers may also be possible but this is not the subject of this invention.

Conventional elastomeric thermoplastic polymers useful in the practice of this invention may be elastomers made from block copolymers such as polyurethanes, copolyetheresters, polyamide polyether block copolymers, ethylene vinyl acetates (EVA), block copolymers having the general formula A-B-A' or A-B like copoly(styrene/ethylene-butylene), styrene-poly(ethylene-propylene)-styrene, styrene-poly(ethylene-butylene)-styrene, (polystyrene/poly(ethylene-butylene)/polystyrene, poly (styrene/ethylene-butylene/styrene) and the like.

Useful elastomeric resins include block copolymers having the general formula A-B-A' or A-B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated $(A-B)_m-X$, wherein X is a polyfunctional atom or molecule and in which each (A-B) $_m$-radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. Nos. 4,663,220 and 5,304,599, hereby incorporated by reference.

Polymers composed of an elastomeric A-B-A-B tetrablock copolymer may also be used in the practice of this invention. Such polymers are discussed in U.S. Pat. No. 5,332,613 to Taylor et al. In such polymers, A is a thermoplastic polymer block and B is an isoprene monomer unit hydrogenated to substantially a poly(ethylene-propylene) monomer unit. An example of such a tetrablock copolymer is a styrene-poly(ethylene-propylene)-styrene-poly (ethylene-propylene) or SEPSEP elastomeric block copolymer available from the Shell Chemical Company of Houston, Tex. under the trade designation KRATON®.

Other exemplary elastomeric materials which may be used include polyurethane elastomeric materials such as, for example, those available under the trademark ESTANE® from B. F. Goodrich & Co. or MORTHANE® from Morton Thiokol Corp., polyester elastomeric materials such as, for example, those available under the trade designation HYTREL® from E. I. DuPont De Nemours & Company, and those known as ARNITEL®, formerly available from Akzo Plastics of Arnhem, Holland and now available from DSM of Sittard, Holland.

Another suitable material is a polyester block amide copolymer having the formula:

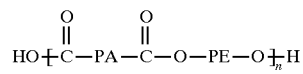

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235 C/1 Kg load); a modulus of elasticity in flexure of from about 20 Mpa to about 200 Mpa, as measured in accordance with ASTM D-790; a tensile strength at break of from about 29 Mpa to about 33 Mpa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235 C/1 Kg load); a modulus of elasticity in flexure of about 29.50 Mpa, as measured in accordance with ASTM D-790; a tensile strength at break of about 29 Mpa, a measured in accordance with ASTM D-639; and an elongation at break of about 650 percent as measured in accordance with ASTM D-638. Such materials are available in various grades under the trade designation PEBAX® from Atochem Inc. Polymers Division (RILSAN®), of Glen Rock, N.J. Examples of the use of such polymers may be found in U.S. Pat. Nos. 4,724,184, 4,820,572 and 4,923,742 hereby incorporated by reference, to Killian et al. and assigned to the same assignee as this invention.

Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117.

The thermoplastic copolyester elastomers include copolyetheresters having the general formula:

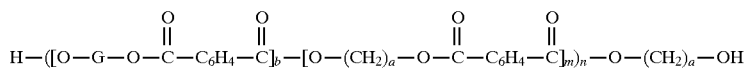

where "G" is selected from the group consisting of poly(oxyethylene)-alpha,omega-diol, poly(oxypropylene)-alpha,omega-diol, poly(oxytetramethylene)-alpha,omega-diol and "a" and "b" are positive integers including 2, 4 and 6, "m" and "n" are positive integers including 1–20. Such materials generally have an elongation at break of from about 600 percent to 750 percent when measured in accordance with ASTM D-638 and a melt point of from about 350° F. to about 400° F. (176° to 205° C.) when measured in accordance with ASTM D-2117. Commercial examples of such copolyester materials are, for example, those known as ARNITEL®, formerly available from Akzo Plastics of Arnhem, Holland and now available from DSM of Sittard, Holland, or those known as HYTREL® which are available from E. I. duPont de Nemours of Wilmington, Del. Formation of an elastomeric nonwoven web from polyester elastomeric materials is disclosed in, for example, U.S. Pat. No. 4,741,949 to Morman et al. and U.S. Pat. No. 4,707,398 to Boggs, hereby incorporated by reference.

The above mentioned conventional elastomers for film and fiber production are non-polyolefinic and have required that processing aids be added to the elastomeric polymer as well. A polyolefin processing aid, for example, may be blended with the elastomeric polymer (e.g., the elastomeric block copolymer) to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U. S. I. Chemical Company under the trade designation Petrothene NA 601 (also referred to herein as PE NA 601 or polyethylene NA 601). Two or more of the polyolefins may be utilized. Extrudable blends of elastomeric polymers and polyolefins are disclosed in, for example, U.S. Pat. No. 4,663,220. Processing aids have heretofore been required for the successful production of films and meltblown fibers from the aforementioned non-polyolefinic elastomers. Unfortunately, processing aids such as NA 601 have a deleterious effect on the hysteresis of the base elastomer.

The inventors have found that a large hysteresis improvement may be accomplished by eliminating the processing aid previously thought necessary by those skilled in the art, and adding another class of polymer or elastomer. The new class of elastomer has a very low or narrow polydispersity number, e.g.; Mw/Mn of 4 or less, and may be made by a process referred to as the metallocene process. Such polymers are sometimes referred to as metallocene catalyzed polymers.

The metallocene polymerization process generally uses a catalyst which is activated, i.e. ionized, by a co-catalyst.

Metallocene process catalysts include bis(n-butylcyclopentadienyl)titanium dichloride, bis(n-butylcyclopentadienyl)zirconium dichloride, bis(cyclopentadienyl)scandium chloride, bis(indenyl) zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl (cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow.

The metallocene polymerization process, and particularly the catalysts and catalyst support systems are the subject of a number of patents. U.S. Pat. No. 4,542,199 to Kaminsky et al. describes a procedure wherein MAO is added to toluene, the metallocene process catalyst of the general formula (cyclopentadienyl)2MeRHal wherein Me is a transition metal, Hal is a halogen and R is cyclopentadienyl or a C1 to C6 alkyl radical or a halogen, is added, and ethylene is then added to form polyethylene. U.S. Pat. No. 5,189,192 to LaPoin te et al. and assigned to Dow Chemical describes a process for preparing addition polymerization catalysts via metal center oxidation. U.S. Pat. No. 5,352,749 to Exxon Chemical Patents, Inc. describes a method for polymerizing monomers in fluidized beds. U.S. Pat. No. 5,349,100 describes chiral metallocene compounds and preparation thereof by creation of a chiral center by enantioselective hydride transfer.

Co-catalysts are materials such as methylaluminoxane (MAO) which is the most common, other alkyl aluminums and boron containing compounds like tris (pentafluorophenyl)boron, lithium tetrakis (pentafluorophenyl)boron, and dimethylanilinium tetrakis (pentafluorophenyl)boron. Research is continuing on other co-catalyst systems or the possibility of minimizing or even eliminating the alkylaluminums because of handling and product contamination issues. The important point is that the metallocene catalyst be activated or ionized to a cationic form for reaction with the monomer(s) to be polymerized.

Polymers produced using the metallocene process have the unique advantage of having a very narrow molecular weight range. Polydispersity numbers (Mw/Mn) of below 4 and as even below 2 are possible for metallocene produced polymers. These polymers also have a controlled short chain branching distribution when compared to otherwise similar Ziegler-Natta produced type polymers.

It is also possible using a metallocene process catalyst system to control the isotacticity of the polymer quite closely when stereo selective catalysts are employed. In fact, polymers have been produced having an isotacticity of in excess of 99 percent. It is also possible to produce highly syndiotactic polypropylene using this system.

Controlling the isotacticity of a polymer can also result in the production of a polymer which contains blocks of isotactic and blocks of atactic material alternating over the length of the polymer chain. This construction results in an elastic polymer by virtue of the atactic portion. Such polymer synthesis is discussed in the journal *Science,* vol. 267, (13 January 1995) at p. 191 in an article by K. B. Wagner. Wagner, in discussing the work of Coates and Waymouth, explains that the catalyst oscillates between the stereochemical forms resulting in a polymer chain having running lengths of isotactic sterocenters connected to running lengths of atactic centers. Isotactic dominance is reduced producing elasticity. Geoffrey W. Coates and Robert M. Waymouth, in an article entitled "Oscillating Stereocontrol: A Strategy for the Synthesis of Thermoplastic Elastomeric Polypropylene" at page 217 in the same issue, discuss their work in which they used metallocene bis(2-phenylindenyl)-zirconium dichloride in the presence of methylaluminoxane (MAO), and, by varying the pressure and temperature in the reactor, oscillate the polymer form between isotactic and atactic.

Commercial production of polymers by the metallocene process is somewhat limited but growing. Such polymers are available from Exxon Chemical Company of Baytown, Tex. under the trade name ACHIEVE™ for polypropylene based polymers and EXACT™ and EXCEED™ for polyethylene based polymers. Dow Chemical Company of Midland, Mich. has polymers commercially available under the names AFFINITY™ and ENGAGE™. Exxon generally refers to their metallocene catalyst technology as "single site" catalysts while Dow refers to theirs as "constrained geometry" catalysts under the name INSIGHT™ to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade. In the practice of the instant invention, elastic polyolefins like polypropylene and polyethylene are preferred.

Regarding metallocene process based elastomeric polymers, U.S. Pat. No. 5,204,429 to Kaminsky et al. describes a process which may produce elastic copolymers from cycloolefins and linear olefins using a catalyst which is a sterorigid chiral metallocene transition metal compound and an aluminoxane. The polymerization is carried out in an inert solvent such as an aliphatic or cycloaliphatic hydrocarbon such as toluene. The reaction may also occur in the gas phase using the monomers to be polymerized as the solvent. U.S. Pat. Nos. 5,278,272 and 5,272,236, both to Lai et al., assigned to Dow Chemical and entitled "Elastic Substantially Linear Olefin Polymers" describe polymers having particular elastic properties.

In addition, a compatible tackifying resin may be added to the extrudable compositions described above to provide tackified materials that autogenously bond. Tackifiers may also aid in adhesion when combining various layers into a laminate and so improve the durablity of the laminate and products made with such a laminate over time. Any tackifier resin can be used which is compatible with the polymers and can withstand the high processing (e.g., extrusion) temperatures. If the polymer is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ® and ARKON® P series tackifiers are examples of hydrogenated hydrocarbon resins. ZONA-TAC®501 lite is an example of a terpene hydrocarbon. REGALREZ® hydrocarbon resins are available from Hercules Incorporated. ARKON® P series resins are available from Arakawa Chemical (USA) Incorporated. The tackifying resins such as disclosed in U.S. Pat. No. 4,787,699, hereby incorporated by reference, are suitable. Other tackifying resins which are compatible with the other components of the composition and can withstand the high processing temperatures, can also be used.

It is also possible to have other materials blended in minor amounts with the polymers used to produce the fiber layer according to this invention like fluorocarbon chemicals to enhance chemical repellence which may be, for example, any of those taught in U.S. Pat. No. 5,178,931, fire retardants, ultraviolet radiation resistance improving chemicals and pigments to give each layer the same or distinct colors. Fire retardants and pigments for spunbond and meltblown thermoplastic polymers are known in the art and are internal additives. A pigment, e.g. $TiO_2$, if used, is generally present in an amount less than 5 weight percentage of the layer while other materials may be present in a cumulative amount less than 25 weight percent.

Ultraviolet radiation resistance improving chemicals may be, for example, hindered amines and other commercially available compounds. Hindered amines are discussed in U.S. Pat. No. 5,200,443 to Hudson and examples of such amines are Hostavin TMN 20 from American Hoescht Corporation of Somerville, N.J., Chimassorb® 944 FL from the Ciba-Geigy Corporation of Hawthorne, N.Y., Cyasorb UV-3668 from American Cyanamid Company of Wayne, N.J. and Uvasil-299 from Enichem Americas, Inc. of N.Y.

Fabrics of this invention may also have topical treatments applied to them for more specialized functions. Such topical treatments and their methods of application are known in the art and include, for example, alcohol repellence treatments, anti-static treatments and the like, applied by spraying, dipping, etc. An example of such a topical treatment is the application of Zelec® antistat (available from E. I. duPont, Wilmington, Del.).

In order to determine the hysteresis improvement attributable to the narrow polydispersity polymer blend, tests were made on a number of laminates with and without the narrow polydispersity polymer. Example 1 is not an example of the invention while Examples 2 and 3 are.

EXAMPLE 1

Two plies of necked spunbond fabric were sandwiched with a molten film of an elastomeric polymer blend. The spunbond fabric was made from a polypropylene polymer designated E5D47 from the Shell Chemical Company of Houston, Tex. at a basis weight of 1.2 osy (41 gsm). The spunbond layers were both extended about 22 percent from their unstreched length.

The film was made from a blend by weight of 63 percent of Shell Chemical Company's Kraton® G-1659, 17 percent of Regalrez® 1126 tackifier, 20 percent of NA 601 low molecular weight polyethylene processing aid, 0.15 percent of an antioxidant known as B900 from the Ciba-Geigy Company, and 5000 ppm of a dusting agent known as Microthene FA-709 from the Quantum Chemical Company of Cincinnati, Ohio. The film had a basis weight of 1.65 osy (56 gsm). The film was extruded at a temperature of about 440° F. (227° C.).

The three layers of the laminate were pulled between nip rolls having a fixed gap of 0.030 inches (0.76 mm) to contact and adhere the film to the spunbond layers as the film was being cooled and solidified.

The laminate was tested for hysteresis at 30 percent elongation and the results are presented in the table.

EXAMPLE 2

Two plies of necked spunbond fabric were sandwiched with a molten film of an elastomeric polymer blend. The spunbond fabric was made from the same polymer as in Example 1 and the spunbond layers were both extended about the same amount as in Example 1 from their unstreched length.

The film was made from a blend by weight of 69 percent of Shell Chemical Company's Kraton® G-1659, 14 percent of Regalrez® 1126 tackifier, 17 percent of Exxon's EXACT® 4038 high molecular weight, metallocene catalyzed linear low density polyethylene, 0.15 percent of antioxidant, and 5000 ppm of Microthene FA-709 dusting agent. The film had a basis weight of from 1.4 to 1.55 osy (47–53 gsm). Two samples of material were made at different film lamination temperatures, about 440° F. (227° C.) and about 460° F. (238° C.).

The three layers of the laminate were pulled between nip rolls having a fixed gap of 0.030 inches to contact and adhere the film to the spunbond layers as the film was being cooled and solidified.

The laminate was tested for hysteresis at 30 percent elongation and the results are presented in the table.

EXAMPLE 3

Two plies of necked spunbond fabric were sandwiched with a molten film of an elastomeric polymer blend. The spunbond fabric was made from the same polymer as in Example 1 and the spunbond layers were both extended about the same amount as in Example 1 from their unstreched length.

The film was made from a blend by weight of 69 percent of Shell Chemical Company's Kraton® G-1659, 17 percent of Regalrez® 1126 tackifier, 20 percent of Dow's AFFINITY® PL1880 high molecular weight, metallocene catalyzed linear low density polyethylene, 0.15 percent of an antioxidant, and 5000 ppm of Microthene dusting agent. The film had a basis weight of about 1.4 to 1.55 osy. Two samples of material were made at different film lamination temperatures, about 440° F. (227° C.) and about 460° F. (238° C.).

The three layers of the laminate were pulled between nip rolls having a fixed gap of 0.030 inches to contact and adhere the film to the spunbond layers as the film was being cooled and solidified.

The laminate was tested for hysteresis at 30 percent elongation and the results are presented in the table.

TABLE

|  | Example 1 | Example 2 | | Example 3 | |
| --- | --- | --- | --- | --- | --- |
| temperature | 440° F. | 440° F. | 460° F. | 440° F. | 460° F. |
| Ratio | 4.25 | 3.22 | 3.57 | 3.89 | 3.54 |
| percent improvement | NA | 32 | 19 | 9 | 24 |

Thus it can be seen that a large improvement in hysteresis is possible by eliminating the low molecular weight polyethylene processing aid and using a high molecular weight narrow polydispersity polyolefin elastomer. All but Example 3 at 440° F. showed greater than 15 percent improvement in hysteresis over the similar laminate using the processing aid, though this was likely due to 440° F. not being an optimal processing temperature.

Composite elastic materials made in accordance with this invention may be used in garments, infection control products and personal care products. More particularly, such materials may be used for the portions of such items which require elastic properties. These portions include, for example, elbow portions and leg, waist and wrist bands or cuffs for surgical gowns and workwear; "stretch ears", outercovers side panels and containment flaps for diapers, training pants, absorbent underpants, and adult incontinence products; bedding, etc.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A composite elastic material laminate having improved hysteresis comprising a layer of an elastic material bonded to a layer of nonelastic material on at least one side, wherein said elastic material layer comprises a blend of a narrow polydispersity number polymer and a conventional elastomer and wherein said blend is essentially free of low molecular weight polyethylene processing aids.

2. The composite of claim 1 wherein said composite elastic material laminate has a hysteresis at least 15 percent better than a similar laminate made without said narrow polydispersity number elastomer but with said processing aid.

3. The material of claim 1 wherein said blend further comprises a tackifier.

4. The material of claim 1 wherein said nonelastic material is selected from the group consisting of microfibers, filament arrays, foams, bonded carded webs and coform webs.

5. The material of claim 1 wherein said elastic material is selected from the group consisting of microfibers, filament arrays, foams and films.

6. The material of claim 1 wherein said narrow polydispersity elastomer is a polyethylene.

7. The material of claim 1 wherein said conventional polymer is selected from the group consisting of polyurethanes, copolyether esters, polyamide polyether block copolymers, ethylene vinyl acetates (EVA), block copolymers having the general formula A-B-A' or A-B like copoly(styrene/ethylene-butylene), styrene-poly(ethylene-propylene)-styrene, styrene-poly(ethylene-butylene)-styrene, (polystyrene/poly(ethylene-butylene)/polystyrene, and poly(styrene/ethylene-butylene/styrene).

8. The laminate of claim 1 made from a process selected from the group consisting of neck bonding, stretch bonding, neck-stretch bonding, and zero strain stretch bonding.

9. A garment comprising the laminate of claim 1.

10. An infection control product comprising the laminate of claim 1.

11. An outercover for personal care products comprising the laminate of claim 1.

12. A cuff for personal care products comprising the laminate of claim 1.

13. A stretch ear for personal care products comprising the laminate of claim 1.

14. A side panel for personal care products comprising the laminate of claim 1.

15. A laminate comprising a layer of nonelastic material bonded while necked to an elastic material layer, said elastic material layer comprising a blend of from about 62 to about 80 weight percent of a conventional elastomer and from about 10 to about 30 weight percent of a narrow polydispersity number polyolefin elastomer, wherein said blend is essentially free of low molecular weight polyethylene processing aids, and wherein said laminate has a hysteresis at least 15 percent better than a similar laminate made without said narrow polydispersity number polyolefin elastomer but with said processing aid.

16. The laminate of claim 15 wherein said nonelastic material is selected from the group consisting of microfibers, filament arrays, foams, bonded carded webs and coform webs.

17. The laminate of claim 15 wherein said elastic material is selected from the group consisting of microfibers, filament arrays, foams and films.

18. The laminate of claim 15 wherein said narrow polydispersity elastomer is a polyethylene.

19. A neck bonded laminate comprising a layer of nonelastic microfiber web material bonded while necked to an elastic film layer, said film comprising a blend of from about 62 to about 80 weight percent of a conventional elastomer and from about 10 to about 30 weight percent of a narrow polydispersity number polyolefin elastomer and wherein said blend is essentially free of low molecular weight polyethylene processing aids.

20. The laminate of claim 19 wherein said laminate has a hysteresis at least 15 percent better than a similar laminate made without said narrow polydispersity number polyolefin elastomer but with said processing aid.

* * * * *

UNITED STATES PATENT AND TRADEMARK OFFICE
CERTIFICATE OF CORRECTION

PATENT NO. : 5,853,881
DATED : December 29, 1998
INVENTOR(S) : Paul W. Estey et al.

It is certified that error appears in the above-identified patent and that said Letters Patent is hereby corrected as shown below:

Column 1, Line 11, "he" should read -- the --
Column 12, Line 29, "trichoride" should read -- trichloride --

Signed and Sealed this

Thirteenth Day of April, 1999

Attest:

Q. TODD DICKINSON

*Attesting Officer*      *Acting Commissioner of Patents and Trademarks*